United States Patent [19]

Lutton et al.

[11] Patent Number: 4,590,806
[45] Date of Patent: May 27, 1986

[54] MONOPOLE DIGITAL VERNIER TORQUE METER

[75] Inventors: David B. Lutton, Bristol; Joel N. Melnick, Vergennes, both of Vt.

[73] Assignee: Simmonds Precision Products, Inc., New York, N.Y.

[21] Appl. No.: 657,276

[22] Filed: Oct. 3, 1984

[51] Int. Cl.⁴ .............................................. G01L 3/12
[52] U.S. Cl. ................................................. 73/862.34
[58] Field of Search ........................... 73/862.33, 862.34

[56] References Cited

U.S. PATENT DOCUMENTS

| | | |
|---|---|---|
| 2,768,525 | 10/1956 | Brownhill et al. . |
| 2,938,378 | 5/1960 | Canada et al. . |
| 3,049,003 | 8/1962 | Felder ............................. 73/862.34 |
| 3,163,037 | 12/1964 | Kawabata . |
| 3,194,065 | 7/1965 | Wilson et al. . |
| 3,208,274 | 9/1965 | Rosaler ............................ 73/862.34 |
| 3,495,452 | 2/1970 | Johnson, Jr. et al. . |
| 3,548,649 | 12/1970 | Parkinson . |
| 3,688,570 | 9/1972 | Burke, Jr. . |
| 3,844,168 | 10/1974 | Tenkman . |
| 3,871,215 | 3/1975 | Pratt, Jr. et al. ................. 73/862.34 |
| 3,888,116 | 6/1975 | Spinella . |
| 3,940,979 | 3/1976 | Ward et al. . |
| 4,136,559 | 1/1979 | Brown . |
| 4,488,443 | 12/1984 | Parkinson ........................ 73/862.33 |

FOREIGN PATENT DOCUMENTS 1281339 7/1972 United Kingdom ............. 73/862.34

OTHER PUBLICATIONS

A. T. Artamonov et al, "Converter of the Torsion Angle of a Shaft into Digital Code" Izmeritelnaya Tekhnika, No. 7, pp. 33-35, Jul. 1978.

Primary Examiner—Charles A. Ruehl
Attorney, Agent, or Firm—Cushman, Darby & Cushman

[57] ABSTRACT

An apparatus and method for measuring the torque of a rotating shaft wherein two gears are placed adjacent to each other on the shaft but are fixed to the shaft at a predetermined distance apart such that the twist in the shaft causes an angular displacement of one of the gears with respect to the other. Each gear is provided with a number of teeth equally spaced thereon, one such gear having a different number of teeth than the other gear and a unique tooth to act as a reference point thus establishing a vernier relationship between the two gears. A single sensing means is positioned at the interface between the adjacent gears and detects the amount of overlap for each pair of gear teeth (one from each gear) as they rotate thereby. Each pair of teeth will be in a different degree of alignment with one such pair being in nearest alignment. As the torque twists the shaft, the location of the pair of teeth in nearest alignment will move circumferentially around the interface between the gears. The output of the single sensing means is transmitted to electronic processing means which compares the degree of alignment of each pair of teeth in each rotation of the shaft, thus identifying the location of the reference point and the pair of teeth in nearest alignment. The distance between these two points is related to the torque being transmitted by the shaft.

24 Claims, 8 Drawing Figures

FIG. 3a
SINGLE POLE MAGNETIC SENSOR

FIG. 3b
SINGLE POLE FIBER OPTIC SENSOR

MONOPOLE DIGITAL VERNIER TORQUE METER

BACKGROUND OF THE INVENTION

This invention relates to the torque measurement field, and more particularly to torque measuring methods and apparatus wherein two toothed wheels, disks, gears or the like are attached to a rotating shaft at some distance apart and the relative positions of the teeth are measured as the twist in the shaft operates to change the position of the teeth with respect to each other.

Existing torque measuring devices of this type often have used two sensors, each monitoring the rotation of one of the gears. See, for example, Brown, U.S. Pat. No. 4,136,559. One disadvantage of this arrangement is that the sensors must be kept accurately aligned with respect to each other. Misalignment of the sensors will lead to torque measurement error. An additional disadvantage of this arrangement is the requirement for a great deal of free space around the rotating shaft. In the space restricted environment of most rotating machinery, there may not be enough room to mount two sensors and two spaced apart gears.

To overcome such problems, monopole sensing schemes have been adapted to the torque measuring field. In Parkinson, U.S. Pat. No. 3,548,649, two gears are placed in near adjacency by fixing one of the gears to a reference sleeve which is, in turn, fixed to the shaft at a predetermined distance from the other gear. Thus, Parkinson +649 uses a monopole sensor to detect relative movement of the two gears. However, to do so, Parkinson '649 interlaces the gear teeth and measures the relative spacings therebetween to arrive at torque.

An analogous technique is adopted in Tenkman, U.S. Pat. No. 3,844,168. There, a monopole sensor is also used to detect the passage of teeth. However, Tenkman '168 does not use a sleeve to bring the teeth into near adjacency. Instead Tenkman '168 projects individual teeth down the shaft from their point of attachment to the location of the sensor.

The reference sleeve technique is also used in Spinella, U.S. Pat. No. 3,888,116 and Ward et al, U.S. Pat. No. 3,940,979. These patents disclose adjacent gears straddled by an optical emitter and sensor. Light shining through the gear teeth is used to measure spacing between the teeth of the two gears.

Torque measurement can be made more accurate by the use of vernier measuring techniques wherein one of the gears is supplied with a different number of teeth than the other. Thus, teeth from the two gears will overlap by a varying amount around the periphery of the gears until, at one point, two teeth are in near alignment. As torque operates to twist the shaft, the location where two teeth are in near alignment will move around the periphery of the gears. By measuring the distance from a known trigger point to the location of near tooth alignment, an accurate measurement of torque can be obtained.

Such a vernier technique was generally disclosed in Wilson, U.S. Pat. No. 3,194,065. However, Wilson '065 employs three separate sensors, one for each of the gears and one to detect a separate projecting trigger point.

SUMMARY OF THE INVENTION

The torque-measuring apparatus of the present invention provides a novel type of monopole torque sensor in a vernier torque measurement system which is nevertheless capable of providing all the necessary plural signal inputs needed to implement a vernier system. Two disc-like members are positioned adjacent each other about a rotating shaft. The first disc is fixed to the shaft and has a number N of detectable discrete structures (e.g. "teeth") spaced evenly thereon, one structure being of extra dimension to act as a once-per-revolution reference or trigger point. The second disc is fixed to a sleeve which, in turn, is fixed to the rotating shaft at some predetermined distance from the first disc. The second disc also has detectable discrete structures (e.g. "teeth") spaced therealong, however the number M of such structures on the second disc is different than the number of detectable discrete structures on the first disc (e.g. $M=N+1$ or $M=N-1$). Thus, a vernier relationship is established between the detectable discrete structures on the first and second discs. The discrete structures on the first disc will overlap those on the second disc. The amount of this overlap will vary around the periphery of the discs in vernier fashion until a pair of such structures will be in alignment (or near alignment).

As torque operates to twist the rotating shaft, the relationships between the two sets of discrete structures will change. The place at which they are most in alignment will move circumferentially around the discs as the torque increases or decreases. A single (i.e. monopole) sensor or detector is located near an interface between the two discs and detects the amount of overlap of each pair of discrete structures as they pass by.

The sensor output pulse train exhibits decreasing pulse widths to the point where a pair of teeth is in nearest alignment. The output from the single sensor is fed into signal processing means which determines the measured torque of the rotating shaft. The processing means, in brief summary, measures the overlap of each pair of discrete structures and compares it to the overlap of previously detected pairs of discrete structures. In this manner, the trigger point and the pair of discrete structures which are most in alignment are detected. The angular displacement of the "aligned" discrete structures is thus measured (with respect to the detected trigger point) and the transmitted torque is calculated from such measurement. As the torque on the shaft varies, the thus measured angular displacement parameter will change, and the processing means can provide an immediate reading of such torque variations.

DESCRIPTION OF THE DRAWINGS

Reference will hereinafter be made to the accompanying drawings wherein like reference numbers denote like elements throughout the various figures, and wherein.

DETAILED DESCRIPTION OF THE PRESENTLY PREFERRED EXEMPLARY EMBODIMENT

Figure 1A:
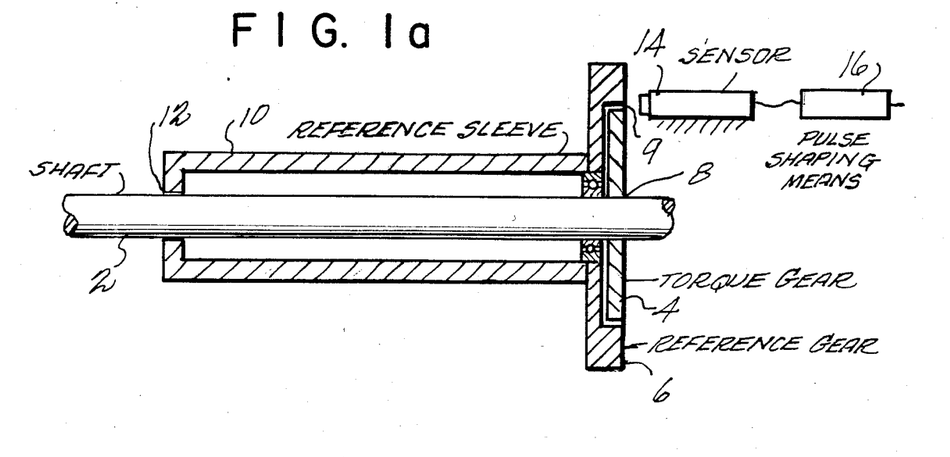
FIG. 1a is a schematic representation of exemplary torque and reference gears artached to rotating shaft transmitting torque, and the sensing and pulse shaping means.

Referring now to FIG. 1a, there is shown a torque shaft 2 with torque gear 4 and reference gear 6 attached thereto. Torque gear 4 is fixed to the shaft at point 8 while the reference gear 6 is fixed to a reference sleeve 10 which is, in turn, fixed to the shaft at point 12. Thus, as transmitted torque twists the shaft, an angular displacement will occur between torque gear 4 and reference gear 6. Magnetic sensor 14 is positioned at the rotational interface 9 between the gears and is responsive to the passage of gear teeth from both gears. For example, a variable reluctance type sensor 14 may be used and adapted to emit a pulse or to maintain a given signal state so long as any portion of a tooth from either gear is substantially adjacent its sensor end face. For example, the electrical output may correspond to a time differential of the passing tooth pair with a leading tooth-pair edge providing a positive-going pulse and a trailing tooth-pair edge providing a negative-going pulse. Conventional signal conditioning circuits may detect such pulses (and/or zero crossings therebetween) and provide more standardized outputs for input to the torque calculating circuits as will be appreciated. Thus such a sensor may emit a pulse or transition to a given state as the leading edge of a reference/torque tooth pair passes and may remain quiescent or in that same state until the trailing edge of the same reference/torque, tooth pair passes the sensor end face when a pulse (e.g. of opposite polarity) or other change of state will occur.

The torque and reference gears can be configured such that the interface between the two gears may be positioned to face in any direction, allowing the sensor to be located in an area most convenient for the equipment being tested. For example, see FIG. 1c. The output of sensor 14 is transmitted to pulse shaping means 16 which passes an electrical pulse to the elecrronic processing means depicted in FIG. 1b. The pulse shaping means 16 may consist of a detector and appropriate circuity to convert the sine wave of magnetic sensor 14 into a square wave pulse train. For example, detectors such as a zerocrossing detector or a level sensitive detector may be adapted to the present invention.

Figure 1B:
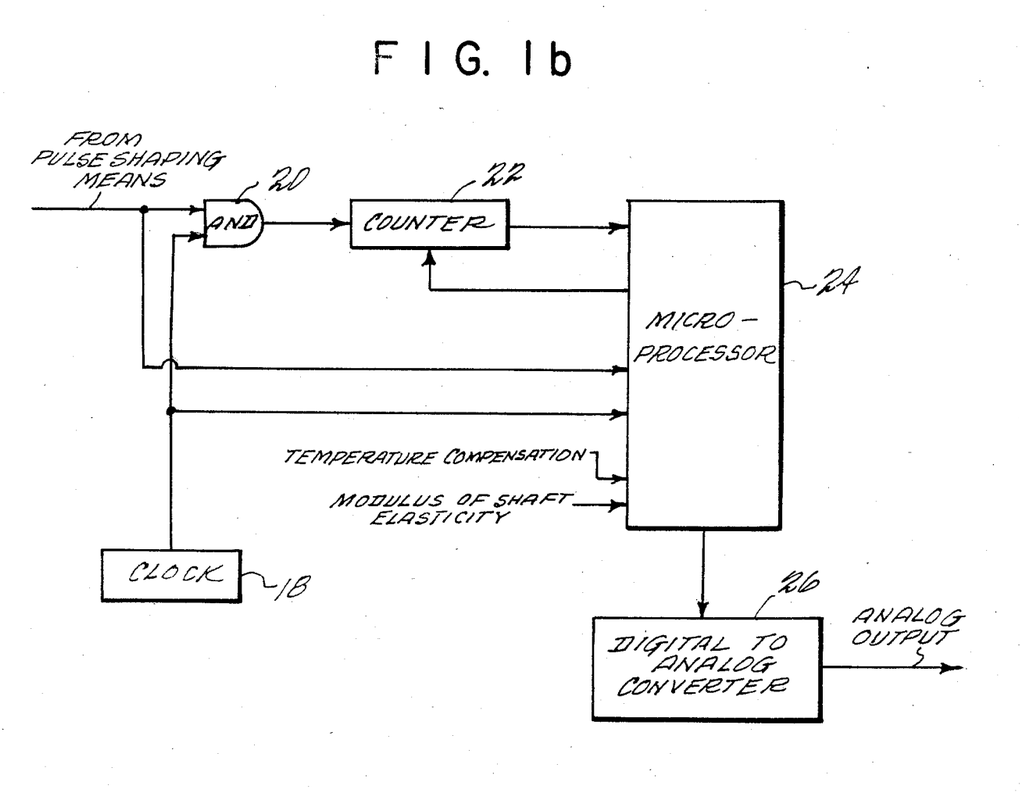
FIG. 1b is a schematic representation of exemplary electrical circuits for converting the detected signals into an accurate representation of torque.

FIG. 1b is a block diagram of exemplary electronic processing means. Clock 18 provides a series of clock pulses to AND gate 20 which also receives the detected signal pulse from pulse shaping means 16. The resultant pulse train is passed to counter 22 which counts the number of clock pulses within each detected signal pulse and passes that count to microprocessor 24. (One microprocessor which may be used in the present invention is the Intel 8051.) Microprocessor 24 also receives direct input from pulse shaping means 16 and clock 18. The microprocessor uses the direct detector output to count the number of detected signal pulses in each rotation of the shaft. Microprocessor 24 then resets counter 22 as each rotation of the shaft is completed. By the process described in FIG. 5, micrcprocessor 24 manipulates the counter output and the pulse shaping output to calculate the torque of the rotating shaft. The torque information calculated in the microprocessor may then be fed to a Digital-to-Analog Converter 26, for example, in order to drive an analog display device (not shown). As will also be appreciated by those in the art, the output torque measurement is also typically corrected for variations in temperature, modulus of shaft elasticity, and/or other system parameters that might affect the degree of shaft twisting as a function of transmitted torque.

Figure 1C:
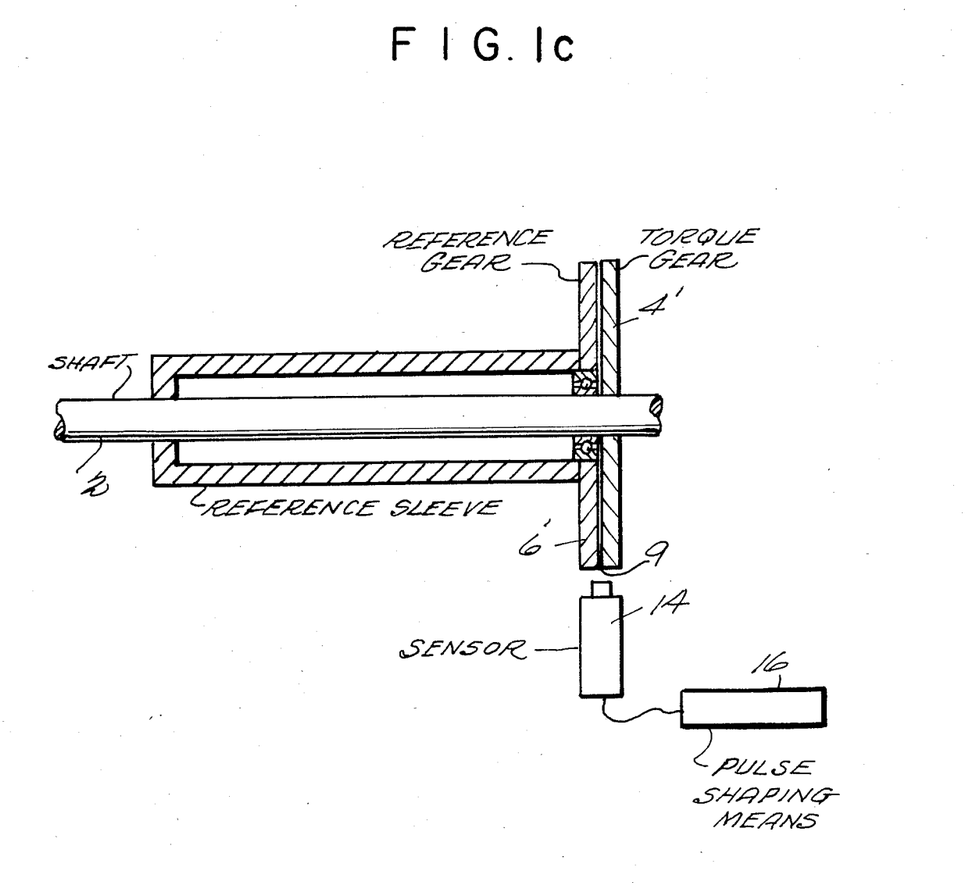
FIG. 1c is a schematic representation of an alternate configuration of the torque and reference gears, and radially mounted sensing means.

FIG. 1c shows an alternate configuration of the torque and reference gears and the sensing means. Sensor 14 is radially positioned to detect the passage of gear teeth from torque gear 4' and reference gear 6'. This configuration operates in the same manner as was described in FIG. 1a, above.

Figure 2:
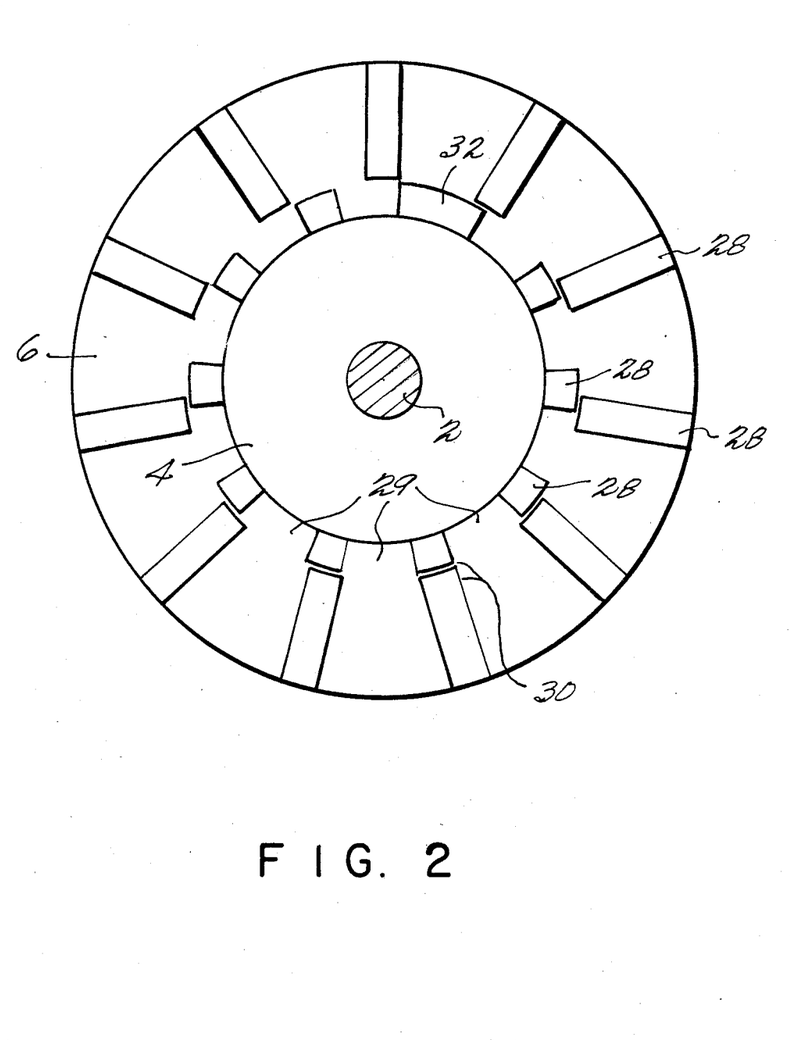
FIG. 2 is a schematic representation of exemplary torque and reference gear teeth and their vernier relationship.

In FIG. 2, one possible vernier relationship between torque gear 4 and reference gear 6 is depicted. Each gear has a quantity of teeth 28 equally spaced thereon. One of the gears has a different number of teeth than the other gear. In this example, the torque gear 4 has ten teeth while the reference gear 6 has eleven teeth. The differing number of teeth automatically establishes a vernier relationship between the two gears wherein teeth from the reference gear overlap teeth from the torque gear in various degrees around the interface between the two gears. At one point on said interface, a pair of teeth (one tooth from each of the gears) will be in nearest alignment, shown at 30. As the torque operating on shaft 2 causes an angular displacement between torque gear 4 and reference gear 6, the location of the pair of teeth in nearest alignment will change. As will be appreciared, the vernier relationship will be present so long as distinct pairs of teeth can be identified. Therefore, the space 29 between the teeth on each gears should be wider than any tooth so that the space between the teeth of one gear could never be blocked by a tooth from the other gear. The same result can be achieved by so constructing the gears that a tooth from one gear is permanently paired with a tooth from the other gear. Such a permanent pair of teeth, while allowing limited relative movement between the teeth, will insure that distinct pairs of teeth can be identified. In order for the detector to accurately determine the location of this pair of gear teeth, a reference point 32 is provided on one or both of the gears. In this example, the reference point is provided on the torque gear and is a gear tooth more than twice as wide as any other tooth. Alternatively, the reference point may be provided as the absence of teeth at that location. The distance between the reference point 32 and the pair of teeth in closest alignment 30 is calculated by the electronic processing means and is substantially proportional to the torque being transmitted by the shaft as will now be appreciated by those in the art.

Figure 3A:
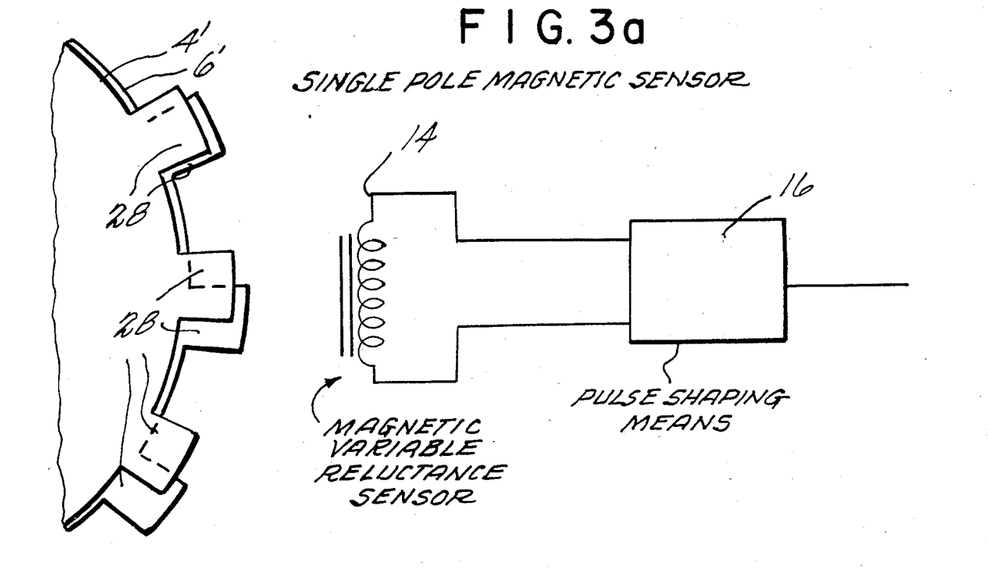
FIG. 3a is a schematic representation of a single pole magnetic sensor which may be used to detect the relationship between the torque gear teeth and the reference gear teeth.

FIG. 3a depicts a single pole magnetic sensor which is one possible sensor which may be used with the present invention. In FIG. 3a, a pair of gear teeth 28 (one tooth from the torque gear 4' and one tooth from the reference gear 6') are detected by the radially mounted sensor as they rotate by. Magnetic variable reluctance sensor 14, comprising a coil and an iron core, detects the presence or absence of gear teeth in front of the pole end face of the sensor. The output from sensor 14 is passed to pulse shaping means 16 which converts the signal into a digital representation indicative of the presence or absence of gear teeth in front of sensor 14. The digital output of pulse shaping means 16 is then passed to the electronic processing means for purposes to be described later herein.

Figure 3B:
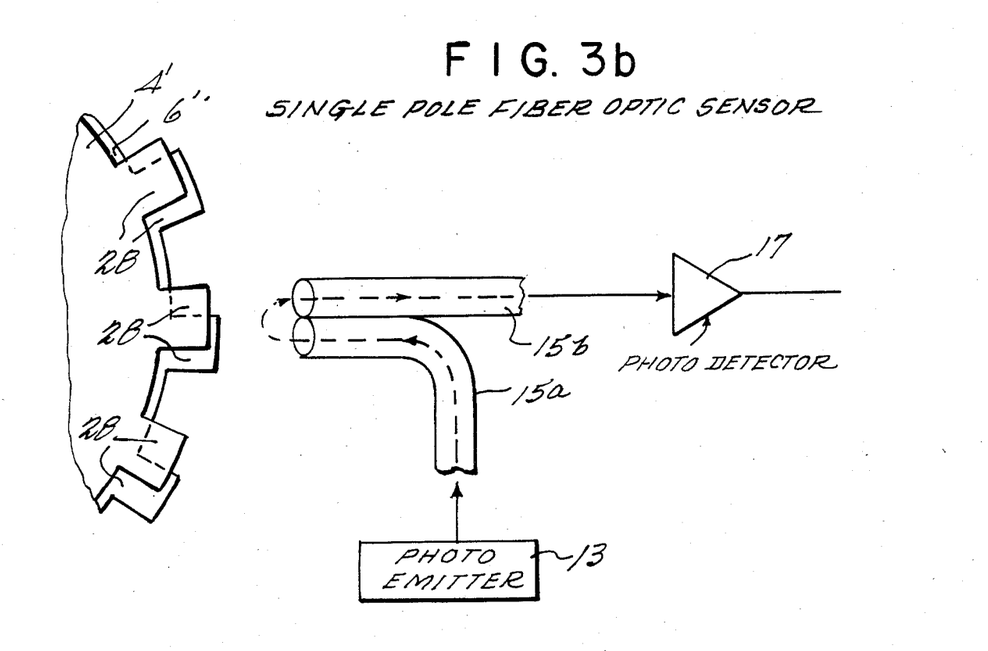
FIG. 3b is a schematic representation of a single pole fiber optic sensor which is one alternative to the single pole magnetic sensor.

FIG. 3b depicts an alternative sensor/detector means which utilizes fiber optic technology. In FIG. 3b, a single pole fiber optic sensor is used to detect the passage of gear teeth. A photo emitter 13 emits light into fiber optic cable 15a which is positioned so as to shine the light on the pair of gear teeth 28. Gear teeth 28 are provided with light reflecting means so that the light from fiber optic cable 15a is reflected back into fiber optic cable 15b. The reflected light is then routed to photodetector 17 which produces a digital signal indicative of a presence or absence of gear teeth in front of the fiber optic sensor. As will be appreciated by those of ordinary skill in the art, present and future technology will provide a wide array of alternative sensor/detector means which may be used with the present invention.

Figure 4:
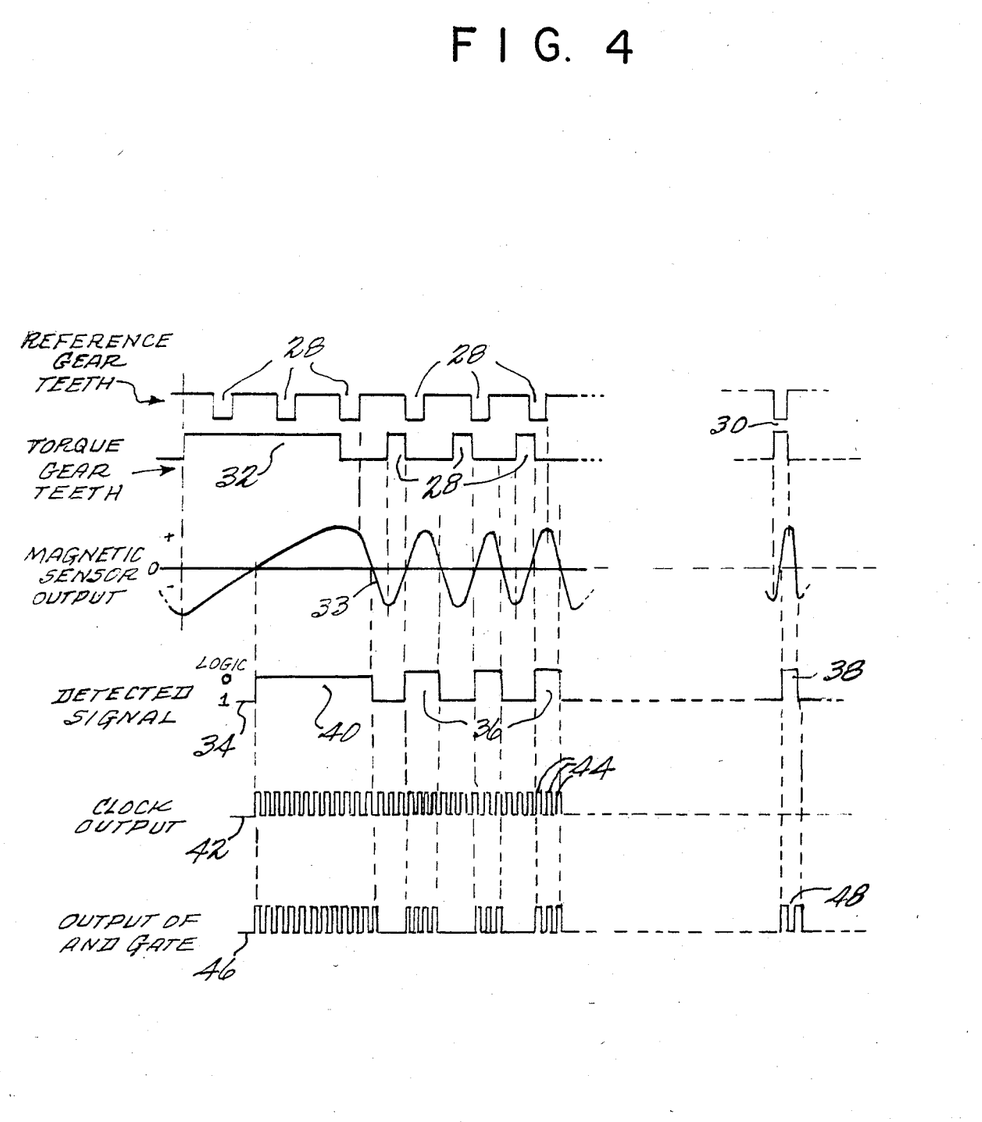
FIG. 4 is a representation of an exemplary interrelationship between the gear teeth and the detected signal.

FIG. 4 shows one exemplary relationship between the rotating gear teeth, the signal output by magnetic sensor 14, the detected signal output from pulse shaping means 16, the output of clock 18, and the output of AND gate 20. In FIG. 4, the gear teeth 28 of torque gear 4 and reference gear 6 are seen to be in various stages of alignment. Reference point 32 on the torque gear can be seen to overlap a number of teeth on the reference gear. The point at which two teeth are in nearest alignment is shown at 30. The output of magnetic sensor 14 is depicted at 33. This signal is fed into pulse shaping means 16. The output of pulse shaping means 16 is depicted as the detected signal 34. In this example of the present invention, a logic "1" is depicted as a low signal, and a logic "0" is depicted as a high signal. Detected signal pulses 36 vary in width as the amount of the overlap between gear teeth 28 changes. At the point where a pair of teeth is in closest alignment 30, the pulse width of the detected signal is at its narrowest, see 38. Conversely, when the reference point 32 passes by sensor 14, a pulse is generated which is the widest pulse, see 40. Determining the width of the detected signal pulses 36 is accomplished by combining a clock output 42 with the detected signal 34 at AND gate 20. The output of AND gate 20, depicted at 46, is thus a pulse train which contains a number of clock pulses 44 within each detected signal pulse 36. By counting the number of clock pulses within each detected signal pulse, the width of the detected signal pulse can readily be determined. As an example, the width of the detected signal pulse corresponding to the reference point 32 is 12 clock pulses wide in FIG. 4. Likewise, the detected signal pulse corresponding to where two teeth are in nearest alignment 30 is 2 clock pulses wide in FIG. 4. Thus, by counting the number of clock pulses 44 within each of the detecred signal pulses 36 the degree of overlap between gear teeth 28 from torque gear 4 and reference gear 6 can easily be determined. Once the location of the reference point 32 and the location where two teeth are in nearest alignment 30 are identified, it is necessary to determine how far apart these two locations are. This determination is easily accomplished by counting the number of detected signal pulses 36 which exist between reference pulse 40 and the narrowest pulse 38.

Figure 5:
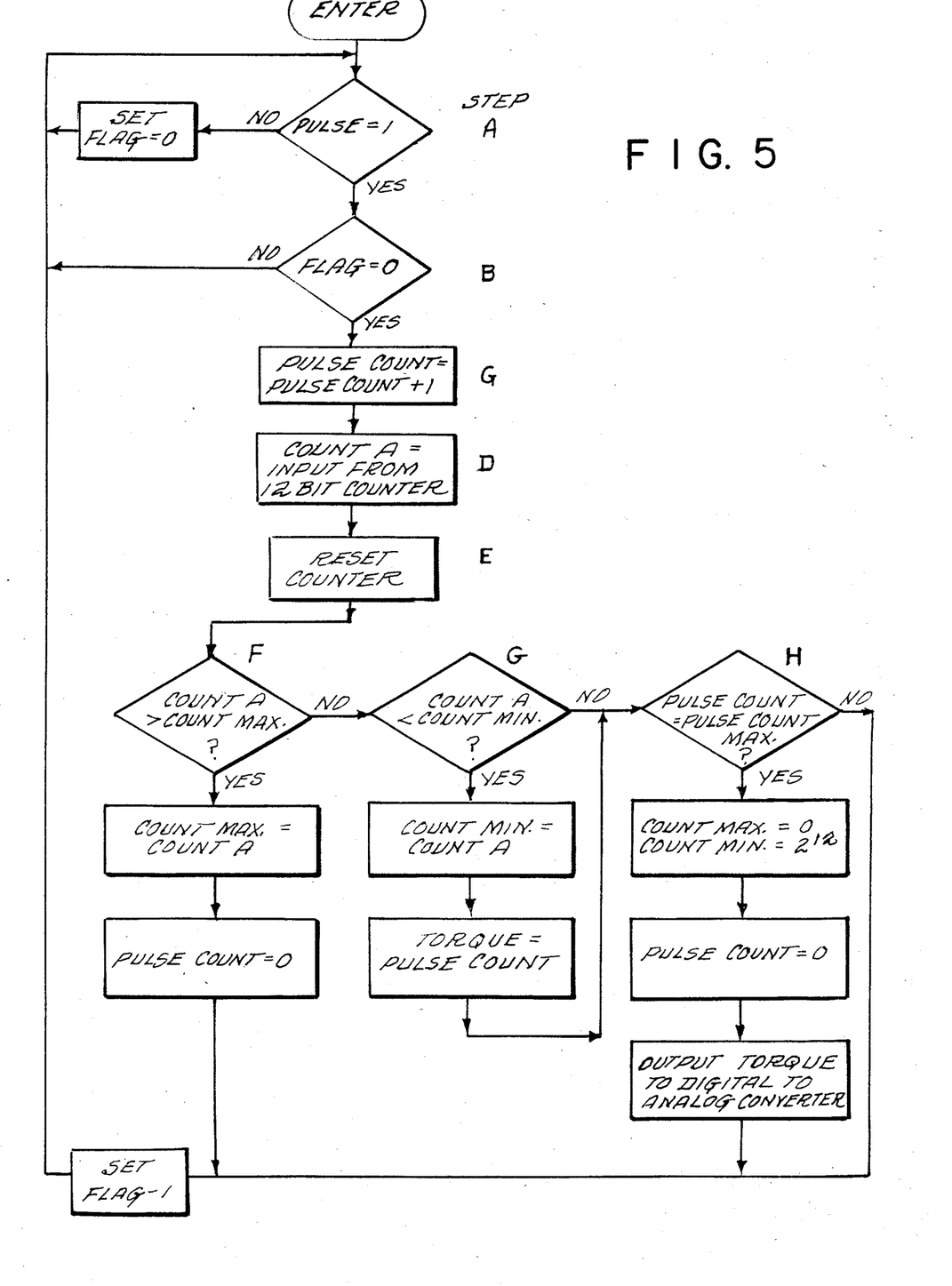
FIG. 5 is a flow-diagram of an exemplary process that the microcomputer may perform to obtain an accurate output representation of torque.

FIG. 5 depicts an exemplary method by which the microprocessor converts the detected signal into an accurate representation of torque. This process can be conveniently implemented by a suitable program imbedded in a programmed ROM, for example, associated with microprocessor 24. In FIG. 5, steps A-F describe the process by which the reference pulse is identified. Steps A-G describe the process by which the narrowest pulse (where two teeth are in nearest alignment) is identified. Steps A-H describe the process by which one completed rotation of the shaft is identified.

The process of FIG. 5 is entered when the sensor has detected the first pair of teeth to pass in front of it. At step A, the first pair of teeth has rotated to a position in front of the sensor and the process begins looking for a completed pulse. This is done by determining the logic level of the detected signal pulse. A logic level 0 indicates that a pair of gear teeth is still in front of the sensor and therefore, the pulse has not yet been completed. A flag will be set to 0 and the system will continue waiting for a completed pulse. When the logic level changes to a 1, this indicates that the gear teeth are no longer in front of the sensor, a pulse has been completed and the system should proceed to count that completed pulse.

At step B, the system determines whether the flag is set at 1 or 0. This will insure that the following steps will be performed only once for each detected signal pulse. If the flag is a 1, this indicates that the just completed pulse has already been counted but the next pair of teeth has not yet rotated to a position in front of the sensor. In this case, the system will return to step A, looking for another completed signal pulse. If the flag is a 0, this indicates that the just completed pulse has not yet been counted and the system proceeds to count that pulse.

At step C, the PULSE COUNT file within the microprocessor 24 is incremented by 1 to indicate that one pair of teeth has passed by the sensor. This PULSE COUNT information will be used to determine the number of pulses between the reference point and the point where two teeth are detected in nearest alignment.

At step D, the 12 bit counter 22 has counted the number of clock pulses within the just completed signal pulse and this information is fed into the microcomputer 24 and labelled COUNT A. The number of counted clock pulses is proportional to the pulse width of the detected signal pulse and, hence proportional to the amount of overlap between that pair of gear teeth. At step E, the microprocessor resets counter 22 so that it can count the clock pulses within the next detected signal pulse.

At step F, COUNT A is compared to the previous maximum count (labelled COUNT MAX) detected so far during the current rotation of shaft 2. If COUNT A is greater than the previous COUNT MAX, COUNT A is designated as the new COUNT MAX. When this occurs, the pulse count is set to zero, the flag is set to 1, and the system returns to looking for another completed pulse. Since COUNT MAX is set equal to zero at the beginning of each rotation (see step H), the first COUNT A is automatically set equal to COUNT MAX. If the next COUNT A is greater than COUNT MAX, it will become the new COUNT MAX and the pulse count will be reset to zero, as a reference point may have just been detected. This process continues until there are no more COUNT As which are greater than COUNT MAX thereby indicating that the true reference point has thus been located.

Where COUNT A is not greater than COUNT MAX, COUNT A is compared to the previous minimum count (labelled COUNT MIN) detected during that rotation of the shaft (see step G). If COUNT A is less than the previous COUNT MIN, COUNT A is designated as the new COUNT MIN. Since COUNT MIN was set equal to $2^{12}$ at the beginning of that rotation of the shaft (see step H), the first COUNT A which is less than COUNT MAX will automatically be the new COUNT MIN. Each subsequent COUNT A which is less than the current value COUNT MIN will, in turn be set equal to COUNT MIN.

This process will continue for each pulse within the current rotation of the shaft until the true COUNT MIN is determined. Where COUNT MIN is determined, the location of that pulse can be determined from the PULSE COUNT value. That location is then input to a TORQUE data file from which the torque can easily be calculated.

After this data has been fed to the TORQUE data file, step H will determine whether one complete revolution of the shaft has been completed. At step H, the pulse count is compared to the maximum number of detected signal pulses in one revolution of the shaft (labelled PULSE COUNT MAX). If the pulse count is not equal to PULSE COUNT MAX, the system returns to step A (after the start of a new pulse causes entry to this subroutine), looking for another complete detected signal pulse.

If the pulse count file is equal to PULSE COUNT MAX, this indicates that all pulses in one revolution of the shaft have been considered and the torque can now be calculated. The location of the narrowest pulse is retrieved from the TORQUE data file and this number is compared to the number of pulses detected when the shaft is transmitting 100% torque. This comparison results in a ratio which is a percentage of 100% torque. When step H indicates that one revolution of the shaft has been completed, COUNT MAX is reset to zero, COUNT MIN is reset to $2^{12}$, the pulse count file is reset to zero, the torque data is sent to the digital-to-analog converter, the flag is set to 1, and the system returns to step A looking for another completed detected signal pulse. In such a fashion, the torque for each revolution of the shaft is determined. The resultant torque figure can then be averaged with the torque from other revolutions of the shaft, or the instantaneous torque of each shaft revolution could be reported.

An example of one configuration of the apparatus of the present invention will now be given. At 100% torque, the location where two teeth are in nearest alignment should be at approximately 300° from the reference point. The remaining 60° of the gear will be taken up by the wide reference point and extra teeth for over and under torque measurements. For example, at 100% torque the location of the pair of teeth in nearest alignment can be set at a 200 tooth increment on the torque gear. Ten additional teeth must be provided for a 5% under torque measurement and 20 teeth must be provided for a 10% over torque measurement. Five teeth must also be added to act as the reference point. Thus the torque gear will have a total of 235 teeth and the reference gear will have a total of 236 teeth. From the above figures, it can be seen that when zero torque is transmitted along the shaft the location where two teeth are in nearest alignment will occur at tooth 10 on the torque gear. In like fashion, the location at 100% torque will occur at tooth 210 on the torque gear. Likewise, 110% torque will be indicated at tooth 230 and −5% torque will be indicated at tooth zero of the torque gear. With this arrangement, if the shaft is rotating at a speed of 25,000 rpm and the clock pulse is 2 MHz there will be approximately 13 clock pulses detected in the narrowest detected signal pulse. If it is determined that a single clock pulse is sufficient, it can be seen that this arrangement of the present invention can function for shaft speeds up to 330,000 rpm.

The invention, as described above, thus provides an apparatus and method for accurarely determining the torque being transmitted along a rotating shaft. It is to be appreciated that the subject invention is not limited to the specific apparatus or method described in the preferred embodiment. One skilled in the art will recognize the advantages of this invention and will also appreciate that there are various ways to implement the invention as disclosed in this document.

What is claimed is:

1. A monopole digital vernier torque meter for measuring the torque transmitted by a rotating shaft, said torque meter comprising:
    first and second toothed wheels fixed to said shaft at spaced apart locations;
    said toothed wheels having different respective numbers of teeth juxtaposed at a predetermined rotational interface so as to define a vernier overlapping relationship therebetween wherein the relative angular location of a predetermined degree of tooth overlap changes as a function of the torque transmitted by said shaft;
    said toothed wheels also comprising a uniquely sensible reference location;
    monopole sensor means disposed to monitor said teeth at said rotational interface and to produce an electrical output signal which includes pulses representing the passage thereby of a tooth or or overlapped teeth and which also includes a unique signal component representing the passage thereby of said reference location; and
    digital electrical signal processing means connected to receive said electrical output signal, to digitally process same by measuring the relative durations of individual pulses in said electrical output signal to detect the instantaneous angular location of vernier tooth positions with respect to said reference location and to thereby produce an electrical torque output signal representative of the torque being transmitted by said shaft.

2. A monopole digital vernier torque meter is in claim 1 wherein said monopole sensor means comprises a variable reluctance magnetic sensor having a pole face disposed to bridge said rotational interface.

3. A monopole digital vernier torque meter as in claim 1 wherein said monopole sensor means comprises:
    a light source;
    an input light pipe means disposed to transmit light from said light source toward said rotational interface at an exit end;
    an output light pipe means disposed to transmit reflected light away from said rotational interface at an entrance end;
    said exit and entrance ends being co-located to provide a monopole optical sensor; and light detector means disposed to receive light from said output light pipe means and to produce said electrical output signal.

4. A monopole digital vernier torque meter for measuring the torque transmitted by a rotating shaft, said torque meter comprising:
first and second toothed wheels fixed to said shaft at spaced apart locations;
said toothed wheels having different respective numbers of teeth juxtaposed at a predetermined rotational interface so as to define a vernier overlapping relationship therebetween wherein the relative angular location of a predetermined degree of tooth overlap changes as a function of the torque transmitted by said shaft;
monopole sensor means disposed to monitor said teeth at said rotational interface and to produce an electrical output signal which represents the passage thereby of a tooth or of overlapped teeth; and
digital electrical signal processing means connected to receive said electrical output signal, to digitally process same and to thereby produce an electrical torque output signal representative of the torque being transmitted by said shaft;
at least one of said first and second toothed wheels having at least one irregularity in its teeth which produces a unique occurrence in said electrical output signal once per revolution of said shaft thereby defining a reference point from which said relative angular location can be measured.

5. A monopole digital vernier torque meter as in claim 4 wherein said irregularity comprises a tooth of larger dimension than any other tooth of either wheel.

6. A monopole digital vernier torque meter as in claim 4 or 5 wherein said digital electrical signal processing means comprises:
clock means for producing regularly recurring clock pulses;
pulse counting means connected to count said clock pulses during the passage of a tooth or of overlapped teeth by said sensor means and to produce a digital pulse count signal representative thereof; and
a digital signal processor means connected to monitor said electrical output signal and said digital pulse count signal so as to
(a) detect said unique occurrence;
(b) detect the minimum pulse count signal value occurrence; and
(c) detect the number of tooth-related pulses occurring in said detector electrical output signal between said (a) and (b) detections as a relative measure of the torque being transmitted by said shaft.

7. A monopole digital vernier torque meter as in claim 6 wherein said digital signal processor means comprises a programmed microprocessor integrated circuit.

8. An apparatus for measuring the torque being transmitted along a rotating shaft, said apparatus comprising:
a first annular member attached to said shaft and having a plurality N of physically detectable discrete structures equally spaced thereon, one such discrete structure having a predetermined detectable reference feature unique from the other discrete structures so as to act as a predetermined reference point;
a second annular member substantially adjacent to said first annular member at a predetermined interface but attached to said rotating shaft at a predetermined distance from the attachment point of said first annular member, said second annular member having a plurality M of physically detectable discrete structures equally spaced thereon but M being different in number than the number N of detectable structures on said first annular member such that a vernier relationship is established between the detectable discrete structures of said first and second annular members wherein a pair of such structures (one from each of said annular members) will be in nearest alignment at at least one place along said interface with the rest of said discrete structures being in various degrees of misalignment around the rest of said interface;
single sensing means bridging said predetermined interface and responsive to the passage of said detectable discrete structures from both of said annular members to generate a sensor output corresponding to the time required for a single non-aligned structure or a pair of partially aligned ones of said structures (one from each said annular member) to pass by said sensing means; and
electrical processing means connected to receive said sensor output and to compare it to other outputs of said sensor to determine the relative locations of said reference point and the pair of structures in nearest alignment and to determine therefrom the torque being transmitted along said rotating shaft.

9. An apparatus for measuring the torque transmitted by a rotating shaft according to claim 8, wherein:
the space between said structures on each said annular member is wider than the width of any of said structures, except for said reference point.

10. An apparatus for measuring the torque transmitted by a rotating shaft according to claim 8, wherein each one of said pairs of physically discrete structures is a permanent pair such that one physically detectable discrete structure from said first annular member is always paired with and adjacent to the same physically detectable discrete structure from said second annular member.

11. An apparatus for measuring the torque transmitted by a rotating shaft according to claim 8, wherein:
said physically detectable discrete structures comprise optically reflective means attached to said first and second annular members; and
said single sensing means comprises an optical sensing means including:
an optical emitter which directs light on said optically reflective means;
an optical sensor which detects the light reflected from said optically reflective means; and
optical detector means for converting the detected light into electrical signals.

12. An apparatus for measuring the torque being transmitted along a rotating shaft, said apparatus comprising:
a torque gear fixed to said rotating shaft and having a number of teeth (N) projecting radially from said rotating shaft, said teeth being equally spaced about the periphery of said torque gear, one such tooth being of unique structure so as to act as a reference point;
a reference sleeve attached to said rotating shaft at a predetermined distance from said torque gear and extending along said rotating shaft to a point adjacent to said torque gear;

a reference gear attached to said reference sleeve at a point substantially adjacent to said torque gear and establishing an interface with said torque gear, said reference gear having teeth disposed in a manner so as to be adjacent to the teeth of said torque gear, except that the number of reference gear teeth is one more (N+1) or less (N−1) than the number of said torque gear teeth, such that a vernier relationship is established between the gear teeth of the torque and reference gears wherein a pair of gear teeth (one from each of the gears) will be in nearest alignment at at least one place along said interface, with the other pairs of gear teeth being in various degrees of misalignment around said interface;

a single magnetic sensing means for simultaneously monitoring the rotation of said torque gear teeth and said reference gear teeth past a predetermined point, said magnetic sensing means detecting the degree of alignment of said torque and reference gear teeth; and electrical processing means connected to receive the output signal of said magnetic sensing means and to compare said signal to other outputs of said sensor to determine the relative locations of said reference point and the pair of gear teeth in nearest alignment wherein such processing means include:

a clock to provide precisely timed pulses;

an AND gate to combine the clock pulses with pulse signals emanating from said magnetic sensing means;

a counter to count the number of clock pulses within each of the detected pulses output by said magnetic sensing means; and a microprocessor to manipulate the output of said counter, said clock, and said magnetic sensing means to generate a digital signal which represents the torque information.

13. An apparatus for measuring the torque being transmitted along a rotating shaft according to claim 12 wherein said electrical processing means further includes a digital-to-analog converter to convert said digital signal into an analog output so that the torque information can be displayed on an analog device.

14. An apparatus for measuring the torque transmitted by a rotating shaft according to claim 12, wherein:
said reference point is a gear tooth which is greater than twice the width of any other tooth.

15. An apparatus for measuring the torque transmitted by a rotating shaft according to claim 12, wherein:
said reference point is indicated by the absence of gear teeth.

16. An apparatus for measuring the torque transmitted by a rotating shaft according to claim 12, wherein:
the space between said gear teeth is greater than the width of any one of said teeth, except for said reference point.

17. An apparatus for measuring the torque transmitted by a rotating shaft according to claim 12, wherein each one of said pairs of gear teeth is a permanent pair such that one tooth from said torque gear is always paired with and adjacent to the same tooth from said reference gear.

18. A monopole digital vernier torque meter method for measuring the torque transmitted by a rotating shaft, said method comprising the steps of:

providing first and second toothed wheels fixed to said shaft at spaced apart locations, said toothed wheels having different respective numbers of teeth juxtaposed at a predetermined rotational interface so as to define a vernier overlapping relationship therebetween wherein the relative angular location of a predetermined degree of tooth overlap changes as a function of the torque transmitted by said shaft and said toothed wheels also comprising a uniquely sensible reference location;

monitoring said teeth at said rotational interface with a monopole sensor to produce an electrical output signal including pulses which represents the passage thereby a of a tooth or of overlapped teeth and which also includes a unique signal component representing the passage thereby of said reference location; and digitally processing said electrical output by measuring the relative durations of individual pulses in said electrical output signal to detect the instantaneous angular location of vernier tooth positions with respect to said reference location and thereby to produce an electrical torque output signal representative of the torque being transmitted by said shaft.

19. A method as in claim 18 wherein said monitoring step comprises monitoring the variable magnetic reluctance of said teeth using a magnetic coil and pole face disposed to bridge said rotational interface.

20. A method as in claim 18 wherein said monitoring step comprises:
monitoring light reflected from said teeth.

21. A monopole digital vernier torque meter method for measuring the torque transmitted by a rotating shaft, said method comprising the steps of:

providing first and second toothed wheels fixed to said shaft at spaced apart locations, said toothed wheels having different respective numbers of teeth juxtaposed at a predetermined rotational interface so as to define a vernier overlapping relationship therebetween wherein the relative angular location of a predetermined degree of tooth overlap changes as a function of the torque transmitted by said shaft;

monitoring said teeth at said rotational interface with a monopole sensor to produce an electrical output signal which represents the passage thereby of a tooth or of overlapped teeth; and digitally processing said electrical output to produce an electrical torque output signal representative of the torque being transmitted by said shaft;

at least one of said first and second toothed wheels having at least one irregularity in its teeth which produces a unique occurrence in said electrical output signal once per revolution of said shaft thereby defining a reference point from which said relative angular location can be measured.

22. A method as in claim 21 wherein said irregularity comprises a tooth of larger dimension than any other tooth of either wheel.

23. A method as in claim 21 or 22 wherein said digitally processing step comprises:
producing regularly recurring clock pulses;
counting said clock pulses during the passage of a tooth or of overlapped teeth by said sensor to produce a digital pulse count signal representative thereof; and monitoring said detector electrical output signal and said digital pulse count signal so as to
(a) detect said unique occurrence;
(b) detect the minimum pulse count signal value occurrence; and
(c) detect the number of tooth-related pulses occurring in said detector electrical output signal between said (a) and (b) detections as a relative measure of the torque being transmitted by said shaft.

24. A method for measuring the torque being transmitted along a rotating shaft, said method comprising the steps of:
(i) establishing a vernier relationship between two annular members attached to said shaft and axially adjacent to each other but fixed to said shaft at a predetermined distance apart, each of said annular members being provided with a plurality of physically detectable discrete structures equally spaced thereon, one of said annular members being provided with a discrete structure having a predetermined detectable reference feature unique from the other discrete structures so as to act as a predetermined reference point, one of said annular members having a quantity N of discrete structures different from the quantity M of discrete structures on the other one of said annular members such that a vernier relationship is established between the discrete structures of said first and second annulars members wherein a pair of discrete structures (one from each of said annular members) will be in nearest alignment at one place along the interface between said annular members and the other pairs of said discrete structures will be in various degrees of misalignment around the rest of said interface, the location of the pair of discrete structures in nearest alignment moving around said interface as the torque operates to twist the shaft and change the angular relationship between said annular members;
(ii) detecting the degree of alignment or misalignment in each of said pairs of reference structures with a single sensing means which bridges the interface between said annular members and is responsive to each of said pairs of discrete structures as they rotate past said single sensing means, the output of said sensing means being a number of detected pulses each of which corresponds to a pair of partially aligned ones of said discrete structures to pass by said single sensing means, the width of each detected pulse being proportional to the degree of misalignment of said pair of discrete structures, the detected signal pulses are AND-ed together with a series of clock pulse which results in a pulse train which consists of a series of detected signal pulses with a number of clock pulses contained in each detected signal pulse;
(iii) determining the location of said reference structure and the location of said pair of discrete structures which are in nearest alignment by counting the number of clock pulses associated with each pair of discrete structures or with a single non-aligned structure and comparing said number of clock pulses with the number of clock pulses associated with other pairs of discrete structures which have passed by said single sensing means during that rotation, when the number of clock pulses is greater than any previous number of clock pulses detected in that rotation, the location of the reference structure has been determined, when the number of clock pulses is less than any other number of clock pulses detected during that rotation, the location of the pair of discrete structures in nearest alignment has been detected; and
(iv) calculating the angular displacement between said annular members by counting the number of pairs of discrete structures between the location of said reference structure and the location of said pair of discrete structures in nearest alignment and dividing said number by the total number of discrete structure pairs and single non-aligned discrete structures in each rotation of said shaft, the results of said calculation being proportional to the torque transmitted by said rotating shaft.

* * * * *